Oct. 17, 1961  A. P. BROYER  3,004,469
EQUIPMENT FOR AUTOMATICALLY PRODUCING PRINTED
INDUCTOR PHOTOGRAPHIC MASTERS
Filed Aug. 28, 1959  13 Sheets-Sheet 1
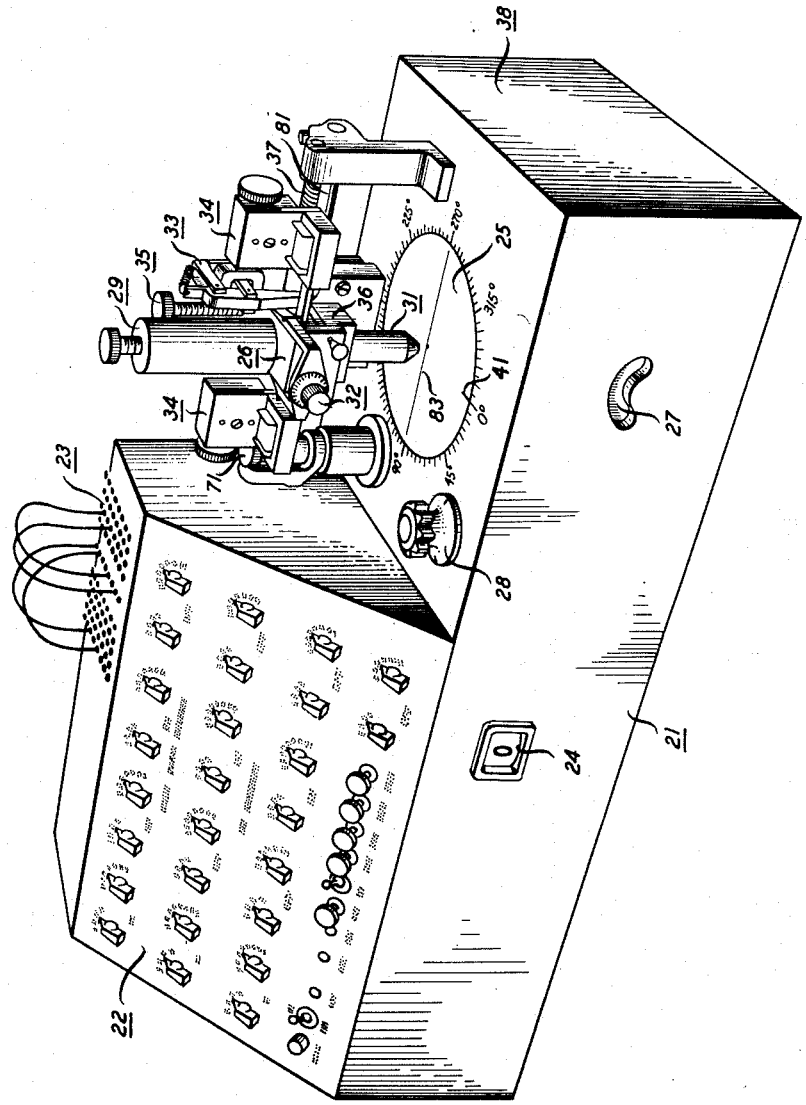
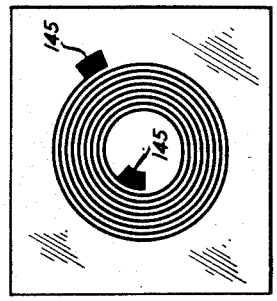
INVENTOR
A. P. BROYER
BY
John K. Mullarney
ATTORNEY Oct. 17, 1961 A. P. BROYER 3,004,469
EQUIPMENT FOR AUTOMATICALLY PRODUCING PRINTED
INDUCTOR PHOTOGRAPHIC MASTERS
Filed Aug. 28, 1959 13 Sheets-Sheet 2

INVENTOR
A. P. BROYER
BY
John K. Mullarney
ATTORNEY

Oct. 17, 1961    A. P. BROYER    3,004,469
EQUIPMENT FOR AUTOMATICALLY PRODUCING PRINTED
INDUCTOR PHOTOGRAPHIC MASTERS
Filed Aug. 28, 1959    13 Sheets-Sheet 3

INVENTOR
A. P. BROYER
BY John K. Mullarney
ATTORNEY

Oct. 17, 1961 A. P. BROYER 3,004,469
EQUIPMENT FOR AUTOMATICALLY PRODUCING PRINTED
INDUCTOR PHOTOGRAPHIC MASTERS
Filed Aug. 28, 1959 13 Sheets-Sheet 5
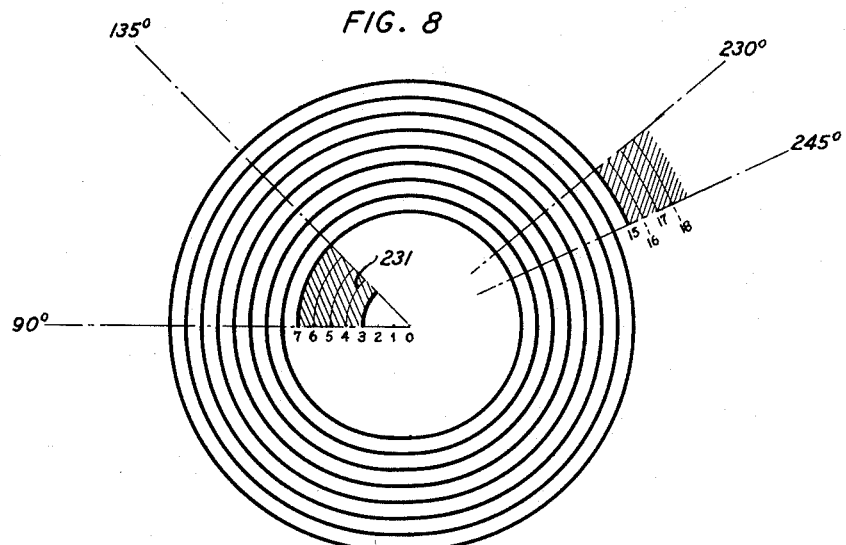
FIG. 8
FIG. 9
| FIG. 10 | FIG. 11 | FIG. 12 |
|---------|---------|---------|
|         | FIG. 13 | FIG. 14 |
|         | FIG. 15 | FIG. 16 |
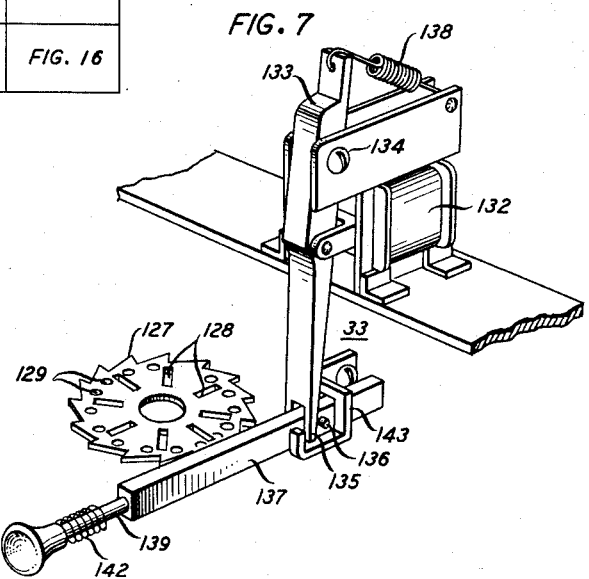
FIG. 7
INVENTOR
A. P. BROYER
BY
John K. Mullarney
ATTORNEY Oct. 17, 1961  A. P. BROYER  3,004,469
EQUIPMENT FOR AUTOMATICALLY PRODUCING PRINTED
INDUCTOR PHOTOGRAPHIC MASTERS
Filed Aug. 28, 1959  13 Sheets-Sheet 13
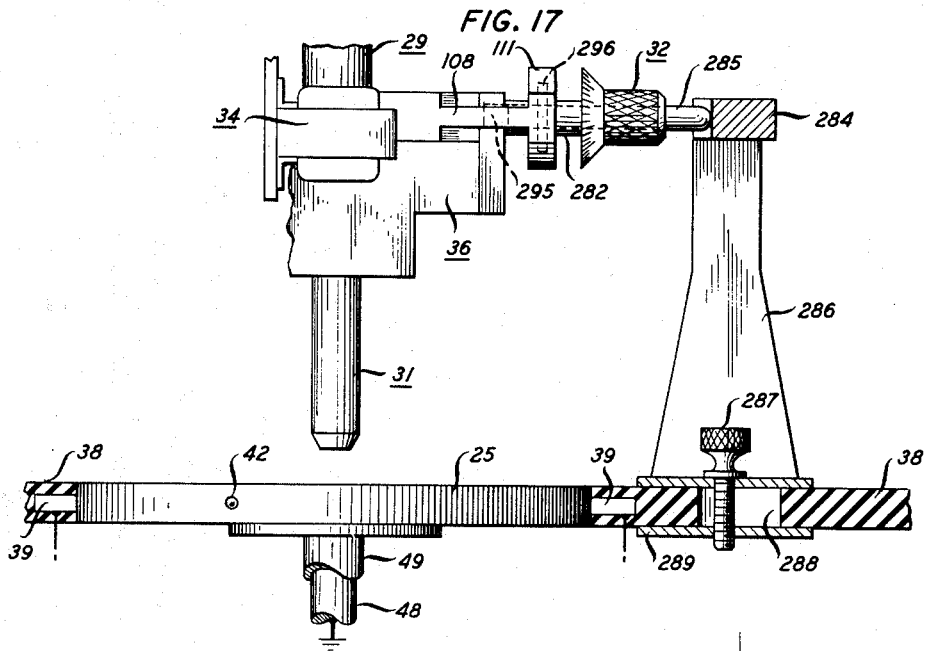
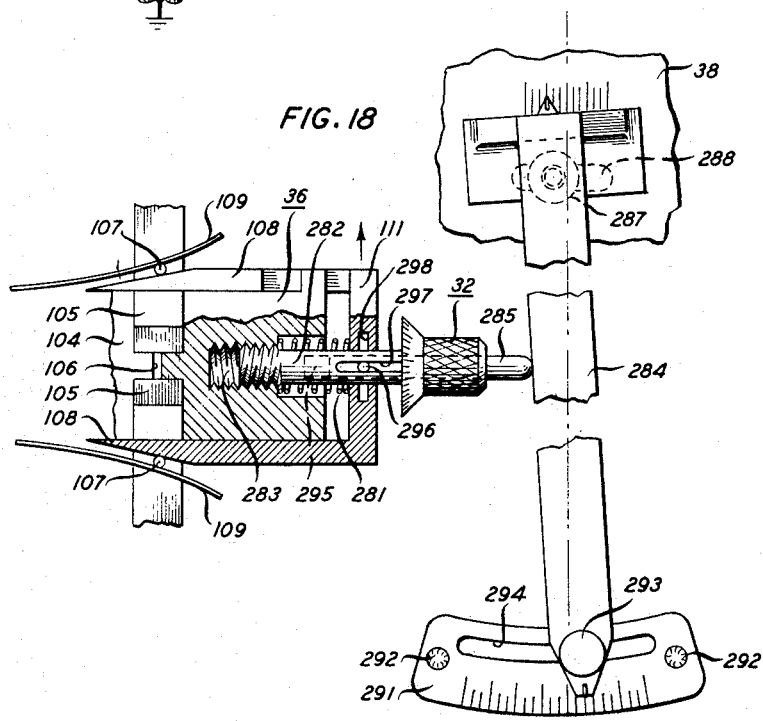
INVENTOR
A. P. BROYER
BY
John K. Mellaney
ATTORNEY United States Patent Office 3,004,469
Patented Oct. 17, 1961

3,004,469
EQUIPMENT FOR AUTOMATICALLY PRODUCING PRINTED INDUCTOR PHOTOGRAPHIC MASTERS
Alfred Paul Broyer, Lake Hiawatha, N.J., assignor to Bell Telephone Laboratories, Incorporated, New York, N.Y., a corporation of New York
Filed Aug. 28, 1959, Ser. No. 836,824
11 Claims. (Cl. 88—24)

This invention relates to apparatus for automatically producing the photographic masters which are used in making printed circuit inductors and the like.

The "etched foil method" is, at present, the most widely used manner of making printed circuit boards and printed circuit components. The quoted expression embraces several techniques, viz. "silk screen," "photosensitive resist," and "offset," which, while somewhat unrelated, commonly necessitate the initial preparation of a photographic master corresponding to the board or component to be produced.

The conventional procedure for preparing such a master is to first make a master art drawing to a scale of four or five to one using drawing inks or pressure sensitive tapes and then reduce this image to full size by photoreduction. This procedure provides a master of tolerable accuracy and line definition but, unfortunately, it is quite time consuming and hence expensive.

Although there is considerable interest in printed circuit inductors, the applications have been rather limited to date because of the difficulty of obtaining development models. Since the formulation of such an inductor is invariably empirical, it is necessary to produce numerous inductors of varying geometry in order to obtain an inductor of selected inductance, field distribution and Q. Now the time required to prepare a photographic inductor master, using the above described conventional procedure, varies from several days to several weeks depending on the complexity of the spiral. This, however, represents only one configuration and since a development program normally requires a large number of trial configurations before a satisfactory design is established, it becomes clear why the use of printed circuit inductors has been limited.

The purpose in first making an enlarged master art drawing and then photoreducing this in scale is, obviously, to obtain a master of superior accuracy and line edge definition. However, as with most things made or processed by hand, the hand made master art drawing leaves much to be desired in these two respects. And, while photoreduction reduces the magnitiude of the inaccuracies in the master art drawing, it of course cannot eliminate them.

It is an object of this inventon therefore to reduce the time required to prepare photographic inductor masters.

Another object of the invention is to improve the accuracy and line edge definition of photographic inductor masters.

It is a further object of this invention to more quickly and expeditiously produce printed circuit inductors and the like.

A still further object of the invention is to provide a device which automatically produces photographic inductor masters and requires very little skill or effort on the part of the operator.

In accordance with the principles of the present invention unexposed photographic film is mounted upon a turntable and a miniature light projector is disposed above the turntable so as to project a narrow beam of light thereupon. The mount for the light projector is geared to move a predetermined lateral distance for each revolution of the turntable with the result that a spiral image is produced on the film. The turntable speed is controlled so that the linear speed at which the projected light passes over the film remains constant irrespective of the radial distance of the light from the center of the turntable. This assures a coil of consistent density from beginning to end. Automatic shutter control means are provided for making masters of any selected number of convolutions, or fraction thereof, with end connection tabs therefor of any given configuration. The apparatus can further be programmed to produce inductor masters of any given line width and convolution spacing and of clockwise or counterclockwise rotation. And while the line width will, in most instances, preferably be of a selected constant value, means are provided whereby the line width can be gradually increased or decreased from convolution to successive convolution.

Other objects and features of the invention will be more readily understood from the following detailed description taken in conjunction with the accompanying drawings, in which:

FIG. 1 is a perspective view of apparatus for producing printed circuit inductor masters in accordance with the present invention;

FIG. 2 illustrates a typical inductor master produced by the apparatus shown in FIG. 1;

FIG. 5 is a partially exploded, perspective view of the optical assembly;

FIG. 8 is a diagram useful in explaining the operation of the apparatus of the present invention;

FIG. 9 shows the manner in which

Figure 3:
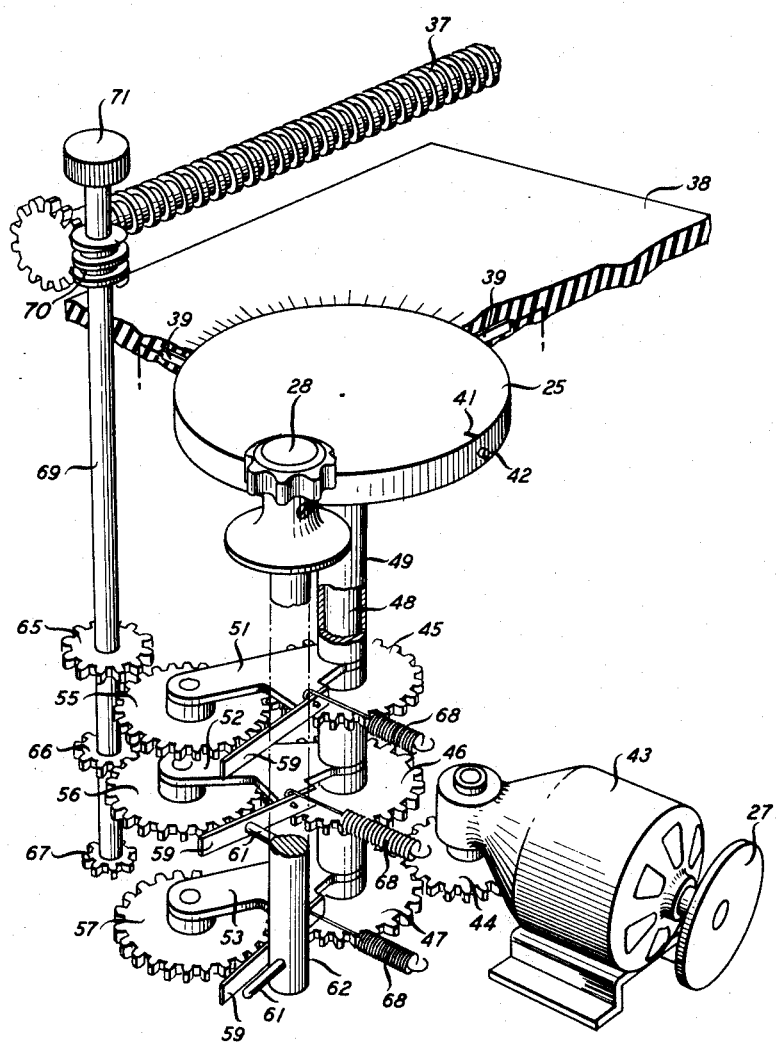
FIG. 3 is a perspective view, partly in section, of the mechanism for driving the turntable and laterally moving the optical assembly.

FIGS. 10 through 16, when arranged as shown in FIG. 9, show the circuit for automatically controlling the various operations of the apparatus of the present invention; and FIGS. 17 and 18 are, respectively, elevation and plan views, partly in section, of a modification for gradually increasing or decreasing the line width from convolution to convolution.

Referring now to the drawings, wherein like reference numerals refer to like parts throughout the several views and, more particularly, to FIG. 1 thereof, the numeral 21 designates the housing which, preferably, is formed of sheet aluminum. Most of the electrical and electronic components are located beneath the sloped control panel 22 located on the left-hand side of the housing. Above the control panel is a pin jack patching board 23 and below is a turntable revolution counter 24. As will be described in detail hereinafter, the control panel and patching board are used to program the equipment to automatically produce a printed circuit inductor master such as that shown in FIG. 2. The turntable 25 and optical assembly 26 are located to the right of the control panel. A flywheel 27 is connected to the shaft of the drive motor and is visible through a slot in the right front of the housing. Rotating this flywheel manually permits fine adjustment of the turntable to any position desired. The knob 28 shifts the necessary gears between the turntable drive shaft and the lead screw 37, in a manner to be described, to provide the desired center-to-center distance between successive convolutions of the inductor master.

The optical assembly 26 comprises a lamp housing 29, a lens system 31, a line width adjustment 32, a shutter actuating mechanism 33, line widening controls 34 and a focusing adjustment 35 all mounted on a carrier block 36 which is moved laterally over the turntable by means of the lead screw 37.

Figure 4:
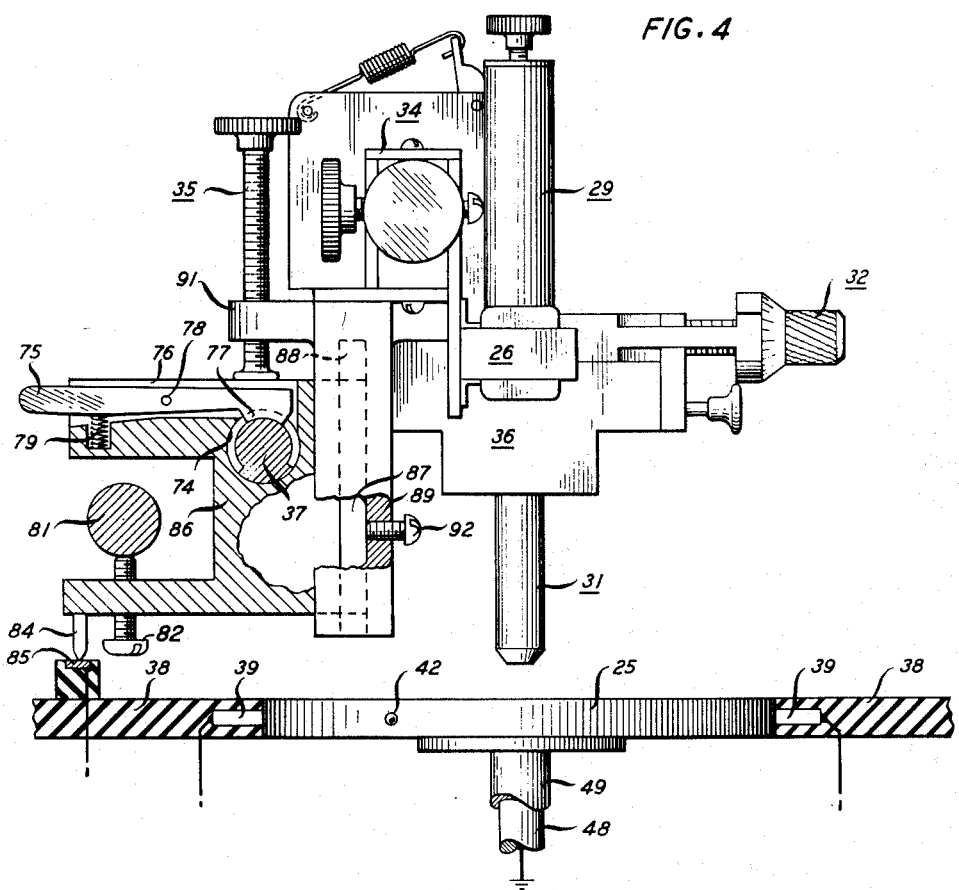
FIG. 4 is a side elevation view, partly in section, of the optical assembly and the mounting means therefor.

Referring now to FIGS. 1, 3, and 4, the turntable 25 is flush mounted in a heavy fibre plate 38 which forms the top of the right-hand compartment of the housing. Lines and numbers are engraved about the peripheral edge of plate 38 which adjoins the turntable. The lines are spaced so as to indicate angular position in five degree increments. A commutator is concealed in said adjoining peripheral edge of plate 38 with narrow copper segments 39 located at each of the five degree, angular position indications. A hole is located in the edge of the turntable directly below the "zero-set" line 41 and a spring loaded silver graphite brush 42 is located in this hole. Thus, as the turntable rotates, the brush 42 alternately contacts the commutator segments. As will be shown and described in greater detail hereinafter, each of the commutator segments is electrically connected to a female socket in the pin jack board 23. Accordingly, if a voltage is applied to the brush while the turntable is rotating, a signal can be read at each pin jack as its corresponding commutator segment is contacted. In essentially this manner, specific peripheral points of any single revolution can be preset to cause a predetermined automatic operation to take place.

A reversible, direct current motor 43, FIG. 3, acts through the intermeshed gears 44, 47 and shaft 48 to rotate the turntable 25. Gears 45, 46 and 47 and turntable 25 are all fixedly mounted on the shaft 48 and the latter is positioned within the hollow sleeve 49. Support arms 51, 52 and 53 are mounted for rotational movement about shaft 48, while the gears 55, 56 and 57 are, respectively, journaled in the free ends thereof. The gears 55, 56 and 57 are in continuous mesh with gears 45, 46 and 47, respectively, and hence all three of the former rotate, as do the latter, when motor 43 is energized. A relatively stiff spring arm 59 is secured at one end, by spot welding or the like, to each of the support arms 51, 52 and 53, while the other end of each spring arm is free. The spring arms are adapted to be engaged by the pins 61 which are mounted at angularly disposed positions on shaft 62. As the knob 28 is rotated the pins are alternately forced against the spring arms 59 to effect, alternately, a partial rotation of the support arms 51, 52 and 53 about shaft 48. This, in turn, results in the gears 55, 56 and 57 being alternately enmeshed with the respective mating gears 65, 66 and 67. Normally the sets of mating gears 55—65, 56—66 and 57—67 are disengaged due to the force exerted by coil springs 68 and it is only when one of the pins 61 is urged against its associated spring arm that one of the sets of mating gears is intermeshed. Due to the angular disposition of the pins 61 and the action of springs 68 only one set of mating gears is in mesh at any one time.

Rotation of any one of gears 65, 66 or 67 is transmitted to the lead screw 37 via the shaft 69 and worm gear 70. The rate of lead screw rotation is, of course, determined by which set of mating gears 55—65, 56—66, 57—67 is in mesh and this, in turn, is dependent upon the setting of knob 28. Accordingly, since the rotation of the lead screw causes the traverse movement of the optical assembly, the setting of knob 28 determines the center-to-center distance between successive convolutions of the inductor master. In one device constructed in accordance with the present invention, mating gear sets were selected to provide center-to-center distances of .020, .025 and .030 of an inch.

The knob 71 is integral with shaft 69 and, with the mating gears 55—65, 56—66 and 57—67 disengaged, it can be rotated manually to provide a fine adjustment of the optical assembly to any desired lateral position.

In FIG. 3 and other figures of the drawings, the minor details, e.g., the manner in which shafts 62 and 69 are supported within the house, the anchoring means for coil springs 68, the electrical connections to the motor and the like, have been omitted for the sake of clarity. Such details will be obvious to those skilled in the art.

Referring to FIG. 4, the carrier block 36, shown partly in cross-section, is provided with an aperture 74 which receives the lead screw 37 also shown in cross-section. A lever arm 75 is mounted in a thin channel 76 in the carrier block and it is provided with a knife edge 77 that serves as a half nut engaging the threads of the lead screw. Arm 75 is pivoted at 78 and thus with the spring 79 urged against the lever arm as shown, the knife edge 77 is normally maintained in engagement with the lead screw. Accordingly, rotation of the lead screw is transmitted through the engaging half nut to the carrier block to laterally move the same and the optical assembly mounted thereon. By depressing the outwardly extending free end of lever arm 75 the engaging half nut is disengaged from the lead screw thus permitting the manual movement of the carrier block along the axis of the lead screw.

Since most of the weight of the carrier block and equipment thereon is forward of the lead screw (i.e., to the right of the lead screw as depicted in FIG. 4) the resultant force acting about the axis of the lead screw, due to said weight, must be counterbalanced. To this end, there is provided a smooth round bar 81 which coextends with and is parallel to the lead screw. The screw 82 extends through a threaded aperture (not shown) in the carrier block and its end abuts the bar 81. As will be clear from FIG. 4, the adjustment of screw 82 determines the angle that the lens system 31 makes with the turntable. This screw is adjusted until said lens system is vertical, i.e. perpendicular to the turntable.

The position of the optical assembly, and especially the lamp housing 29 and lens system 31, with respect to the turntable is such that the projected light traverses the diametric line 83, FIG. 1, as the carrier block 36 moves from one end of lead screw 37 to the other. To aid in initially centering the projected light without the necessity of turning the same on, a brush 84 is mounted on the carrier block 36, FIG. 4, and is adapted to contact the narrow, copper segment 85 fixedly mounted to the plate 38. The narrow segment 85 is initially mounted to the plate so as to make contact with the brush 84 while the projected light is directed at the exact center of the turntable. The brush 84 and narrow segment 85 thereafter serve as a simple switch and by placing the same in series with a light bulb mounted on the control panel 22, a visible indication is provided when the optical assembly is centered over the turntable.

The carrier block 36, FIG. 4, consists of two sections, section 86 which receives the lead screw 37 and has the lever arm 75 and brush 84 mounted thereon and section 89 which carries or supports the optical assembly 26. Section 86 is provided with a pair of integral, outwardly or laterally extending flanges 87 which are received and adapted to slide in channels 88 provided in section 89. The bolt 35 is threaded in an aperture in extension 91, which is integral with section 89, and the bolt end abuts the upper surface of section 86. As the bolt 35 is rotated the section 89, and hence the lens system 31 which is mounted thereon, is moved toward or away from the turntable 25. Adjustment is continued until proper focus is achieved at which time set screws 92 are tightened to lock the two sections 86 and 89 together.

As heretofore described, the optical assembly is shown, in FIGS. 4 and 5, to comprise a lamp housing 29, a lens system 31, a line width adjustment 32, a shutter actuating mechanism 33, line widening controls 34 and a focusing adjustment 35 all mounted on a carrier block 36. The lamp housing, shown in detail in FIG. 5, comprises a metal tube 95 having a polished interior and a top cover 96 having a threaded central aperture through which the screw adjustment 97 passes. A conventional type light socket 98 is fixedly mounted to the end of the screw adjustment 97 and a frosted light bulb 99 is fitted in the socket. The distance between the light source and the collimating lens 101 is adjusted to provide proper light collimation and a minimum of projected filamental striations. As shown in dotted outline at 102, the upper plate 103 of the carrier block is counterbored to provide a seat for the lower end of the lamp housing.

The rectangular image projected on the turntable is defined by the plate 104 and sliders 105. An elongated slit 106 is provided in the plate and the sliders 105 are adapted to move toward or away from each other along the length of the slit. Upwardly projecting pins 107 are fixedly mounted on sliders 105 and are urged against the tapered end portions of arms 108 by means of springs 109. The arms 108 are integral with a yoke portion 111 and the latter is spring biased, by means not shown, against the line width adjustment knob 32. A scale, indexed in terms of line width, is scribed on the adjustment knob, and a threaded bolt integral with the latter is received in a tapped hole (not shown) in the carrier block. As the knob 32 is rotated the arms 108 and the integral tapered portions will move inwardly or outwardly therewith. These tapered portions act as cam surfaces and cause movement of the followers or pins 107 which, in turn, is transmitted to the sliders 105. Knob 32, therefore, controls the length of the rectangular slot defined by plate 104 and sliders 105 which, in turn, determines the width of the spiral line produced on the photographic film taped to the turntable.

The line widening controls 34 serve to increase the line width (that is, the length of the rectangular slot defined by the mask just described) at predetermined points in the rotation of the turntable. To this end, the plungers of the plunger type solenoids 113 are secured to the ends of the sliders 105. Thus, upon energization of the solenoids 113 the sliders are pulled away from each other to instantaneously increase line width.

Figure 6:
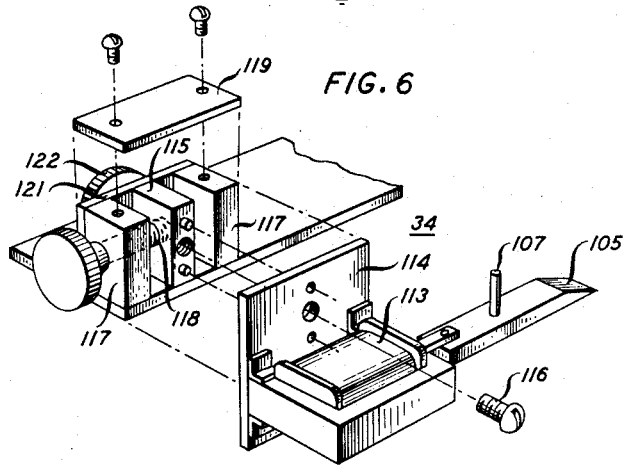
FIG. 6 is an exploded detailed view of one of the line widening controls shown in FIG. 5.

Each solenoid 113 is mounted on a plate 114, FIG. 6, which is, in turn, connected to a movable block 115 by screw 116. The movable block is disposed between two fixed blocks 117 and it is provided with a threaded aperture which receives the threaded bolt 118, the latter being journaled in fixed blocks 117. As the bolt 118 is rotated, block 115, plate 114 and solenoid 113 are moved translationally.

The respective positions of the solenoids are of no consequence so long as the solenoids are not energized. However, the relative positions of said solenoids with respect to their associated plungers determine the distances that said plungers are required to move when the solenoids are energized. Accordingly, the energization of solenoids 113 causes an increase in the length of the rectangular slot defined by the mask and the extent of this increase can be preset.

A top cover plate 119 is secured to the fixed blocks 117, as is the side plate 121. This latter plate is provided with an elongated slot (not shown) that is more or less coextensive with the bolt 118. A locking screw adjustment 122 extends through this elongated slot and is threaded into a tapped hole in movable block 115. After the solenoid 113 is set to its preferred position, the locking screw is tightened to prevent further movement of the block 115 and the solenoid.

Figure 7:
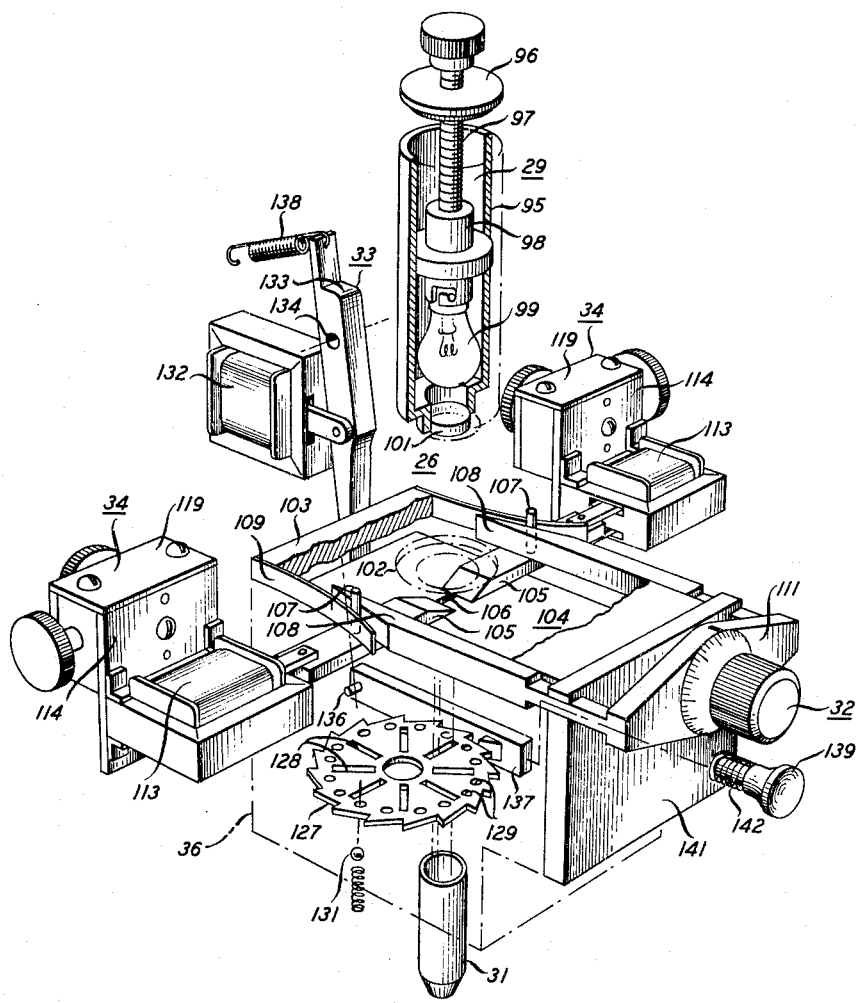
FIG. 7 is a detailed perspective view of the shutter mechanism.

The shutter mechanism 33, shown in FIGS. 5 and 7, comprises a pawl operated ratchet wheel 127 which is mounted for rotary movement within the carrier block. Slots 128 are provided in the ratchet wheel next to every other tooth and a small aperture 129 is located next to every tooth. A ball bearing 131, of a diameter slightly greater than apertures 129, is spring biased so as to alternately engage the apertures in standard detent fashion. As the ratchet wheel is stepped around one tooth at a time, the light passed by the mask will alternately (1) pass through a slot in the ratchet wheel and (2) be blocked by said wheel.

The ratchet wheel is moved or step rotated each time the plunger type solenoid 132 is energized. The plunger of this solenoid is pivotally attached to the lever arm 133 and the latter, in turn, is pivotally mounted at 134. Lever arm 133 is bifurcated at 135 and each leg of the bifurcation is adapted to be urged, upon energization of the solenoid, against one of the pins 136 mounted on pawl arm 137. Thus, the movement of the plunger into the solenoid upon energization of the same is transmitted, via the lever arm 133, pins 136 and pawl arm 137, to the ratchet wheel to step rotate it to the next position. The coil spring 138 returns the lever arm and plunger to their original positions following deenergization of the solenoid.

The pawl arm 137 is provided with an integral extension 139 which extends out beyond the front plate 141, FIG. 5, of the carrier block. This extension permits manual setting of the shutter to either "pass" or "not pass" the light as required. The coil spring 142 maintains the ratchet wheel and pawl normally disengaged.

The U-shaped member 143, FIG. 7, serves as a stop to limit the movement of the lever arm 133 and pawl arm 137. The member 143 is secured to the side of the carrier block, by spot welding or the like, and the arm 137 extends along this side. The ratchet wheel can be of a diameter such as to extend a short distance outwardly from said side of the carrier block or, alternatively, a portion of the carrier block adjacent the ratchet wheel can be machined away to provide access to said wheel.

As indicated in FIG. 5 by the dotted extensions from lever arm 133 and pawl arm 137, the ratchet wheel and pawl subassembly is shown, for purposes of clarity, in a position somewhat lower than that normally occupied.

A conventional type lens system 31 has its end disposed in a vertical bore (not shown) provided in the carrier block. The lens tube can be secured in said bore by conventional set screw means. The light passed by the shutter mechanism proceeds down the bore to said lens system where it is further collimated and then projected onto the unexposed photographic film taped to the turntable. The projected rectangular image should preferably have a width of the order of .005 inch (and a somewhat longer adjustable length) and, therefore, some degree of image reduction will in most cases be necessary. The extent of this image reduction will, of course, depend upon the size of the rectangle defined by plate 104 and sliders 105. Knowing the size of said rectangle, it is within the skill of one in the art to select lenses that provide the required reduction.

As shown in FIG. 1, the length axis of the projected rectangular image extends along line 83.

Before the equipment is programmed to automatically produce a printed circuit inductor master, certain parameters should be decided upon. For example, the line width and the center-to-center distance between successive convolutions should be chosen. The former is set by the line width adjustment knob 32 and the latter by the gear shifting knob 28.

The preferred direction of rotation of the inductor spiral is determined by a "turntable rotation" switch located on the control panel board. If the optical assembly is moved from the center outwardly toward the right while the turntable is rotated in a clockwise direction, the produced spiral will trace a counterclockwise path from the inner to the outer convolution. And, when the direction of rotation of motor 43 is reversed thus reversing the movement of the optical assembly and the rotation of the turntable, a clockwise path will be traced.

The inside radius of the inductor master in inches should likewise be decided upon, as should the number of complete and partial windings thereof. This inside radius is the distance from the center of the turntable to the point where the spiral begins and it is normally regarded as the most important dimension of the inductor. Knowing the preferred radius, center-to-center distance and line width, the inside radius can be readily calculated in terms of turntable revolutions and the equipment then programmed accordingly in the manner to be described.

Finally, the length, width and location of the end connection tabs 145, FIG. 2, should be chosen. In general, the starting point of the inside of any inductor will also be the beginning of the inside tab in degrees. Likewise, the terminating point of the outside of any inductor will also constitute the termination of the outside tab in degrees. The tabs are not considered critical insofar as their dimensions are concerned because they are only a means of electrically connecting to the inductor and generally have little effect on inductance.

Let it be assumed, for purposes of explanation, that an inductor spiral such as that shown in FIG. 8 is desired. The spiral itself begins at the 90° point of the seventh revolution of the turntable and terminates at the 245° point of the fifteenth revolution. The end connection tabs comprise the cross-sectioned portion of the spiral of FIG. 8.

Figure 13:
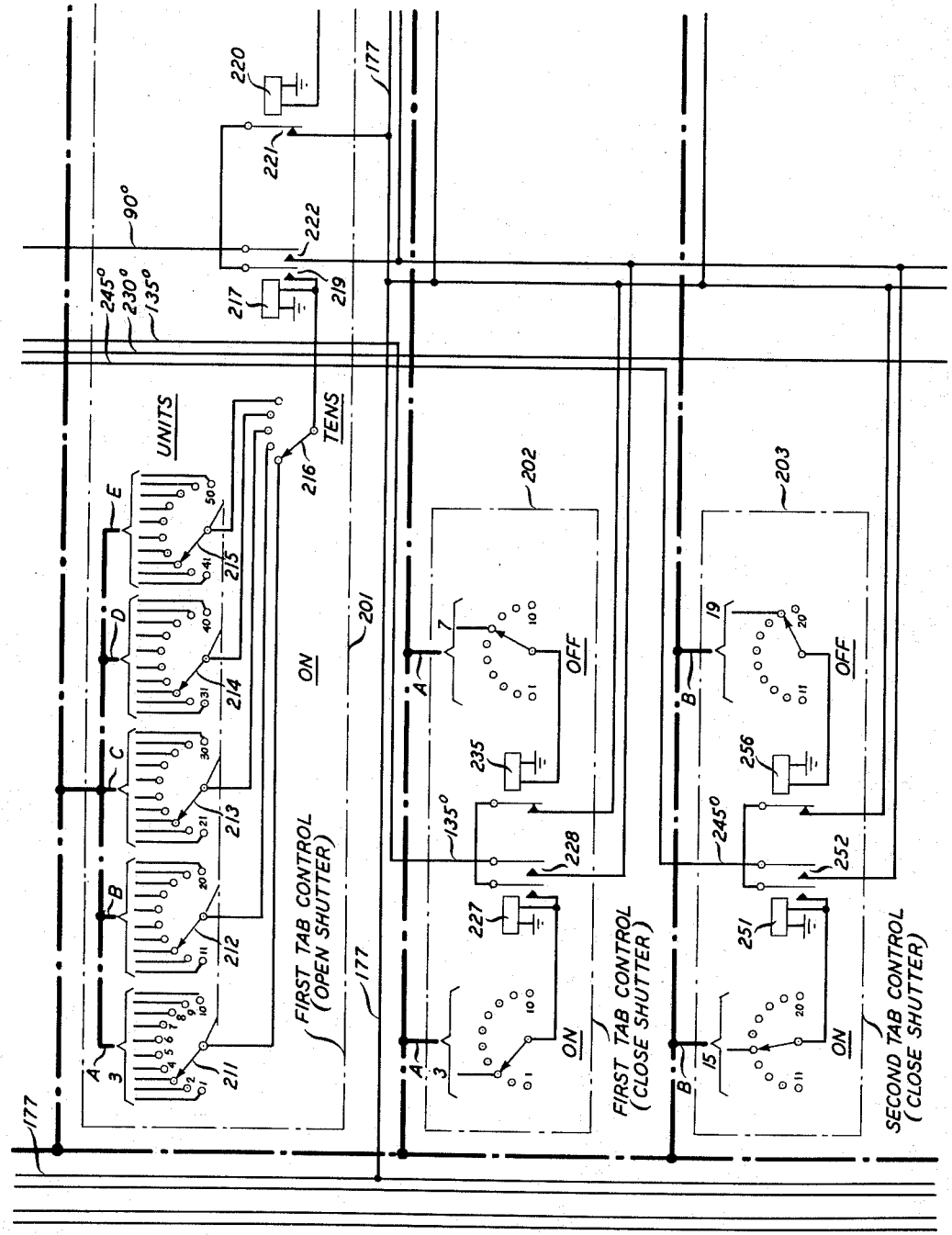
Figure 14:
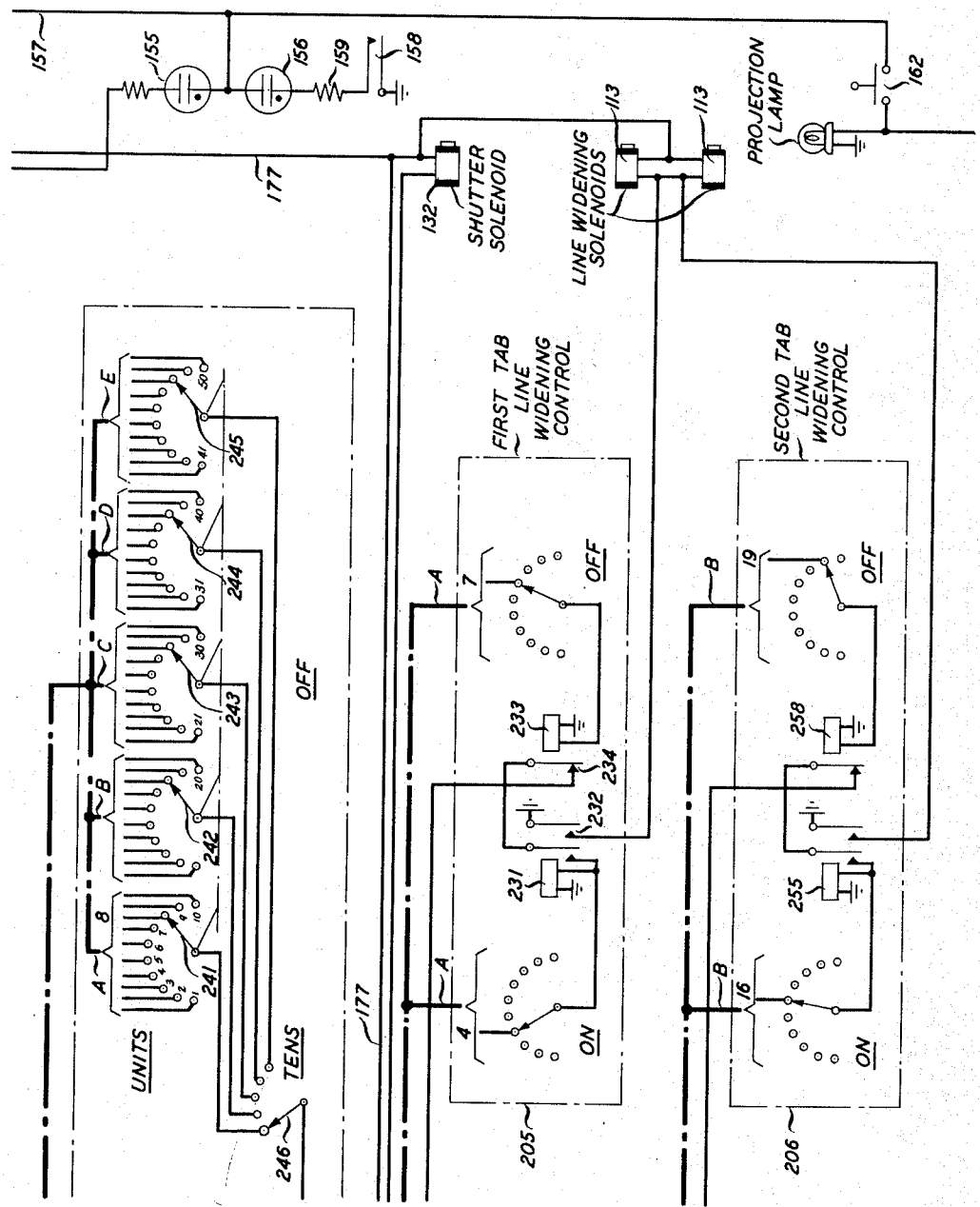
Figure 15:
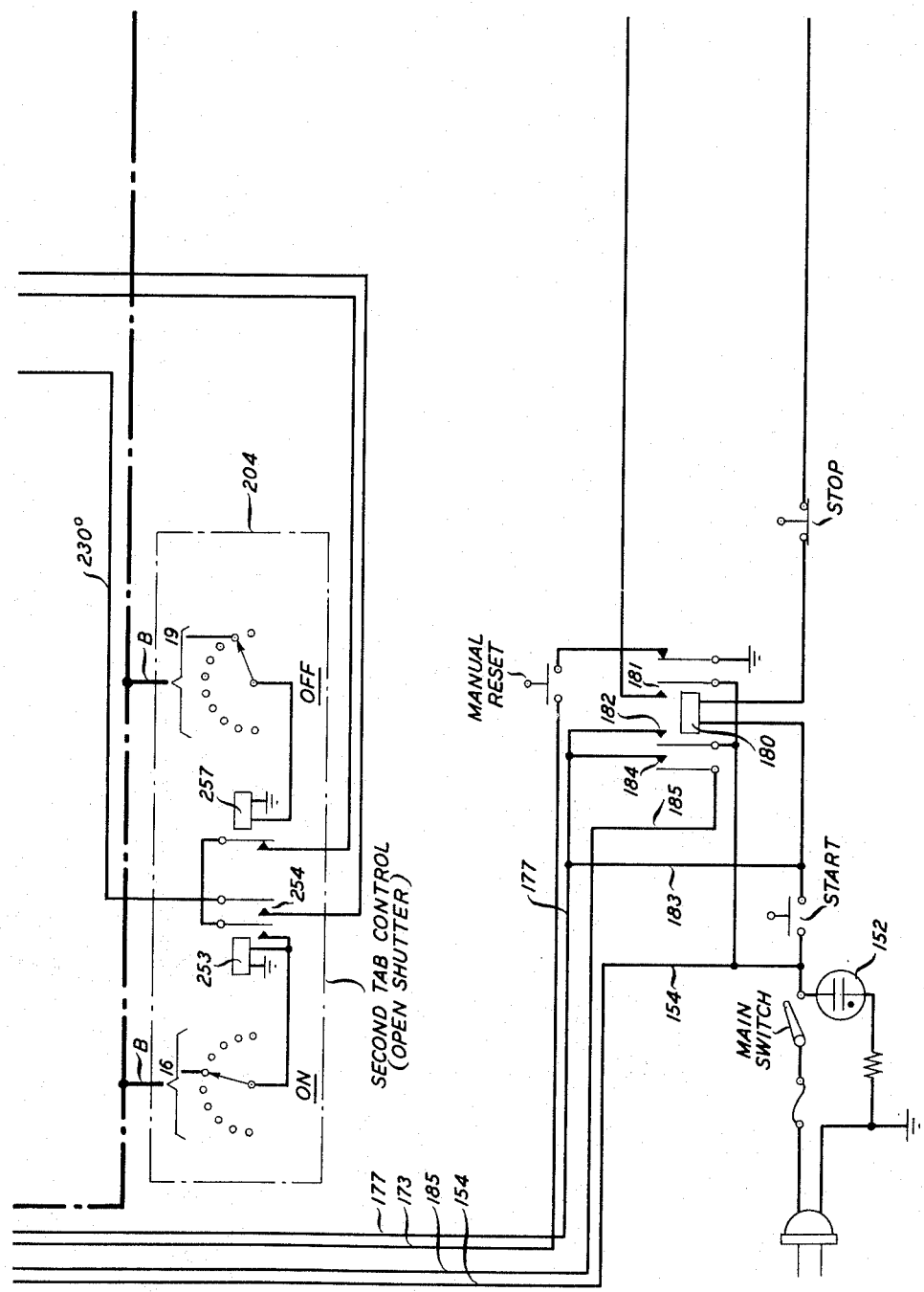

Reference should now be had to FIGS. 10 through 16 (arranged as shown in FIG. 9) for a detailed schematic diagram of the electrical circuit for automatically producing printer circuit inductor masters. The main switch, FIG. 15, is first closed to permit the equipment to warm up, this closure being indicated by neon lamp 152 mounted on the control panel. The closure of the main switch applies power to the filament transformer 153, FIG. 10, via the lead 154 and to the junction of neon lamps 155 and 156, FIG. 14, via leads 154 and 157.

Figure 12:
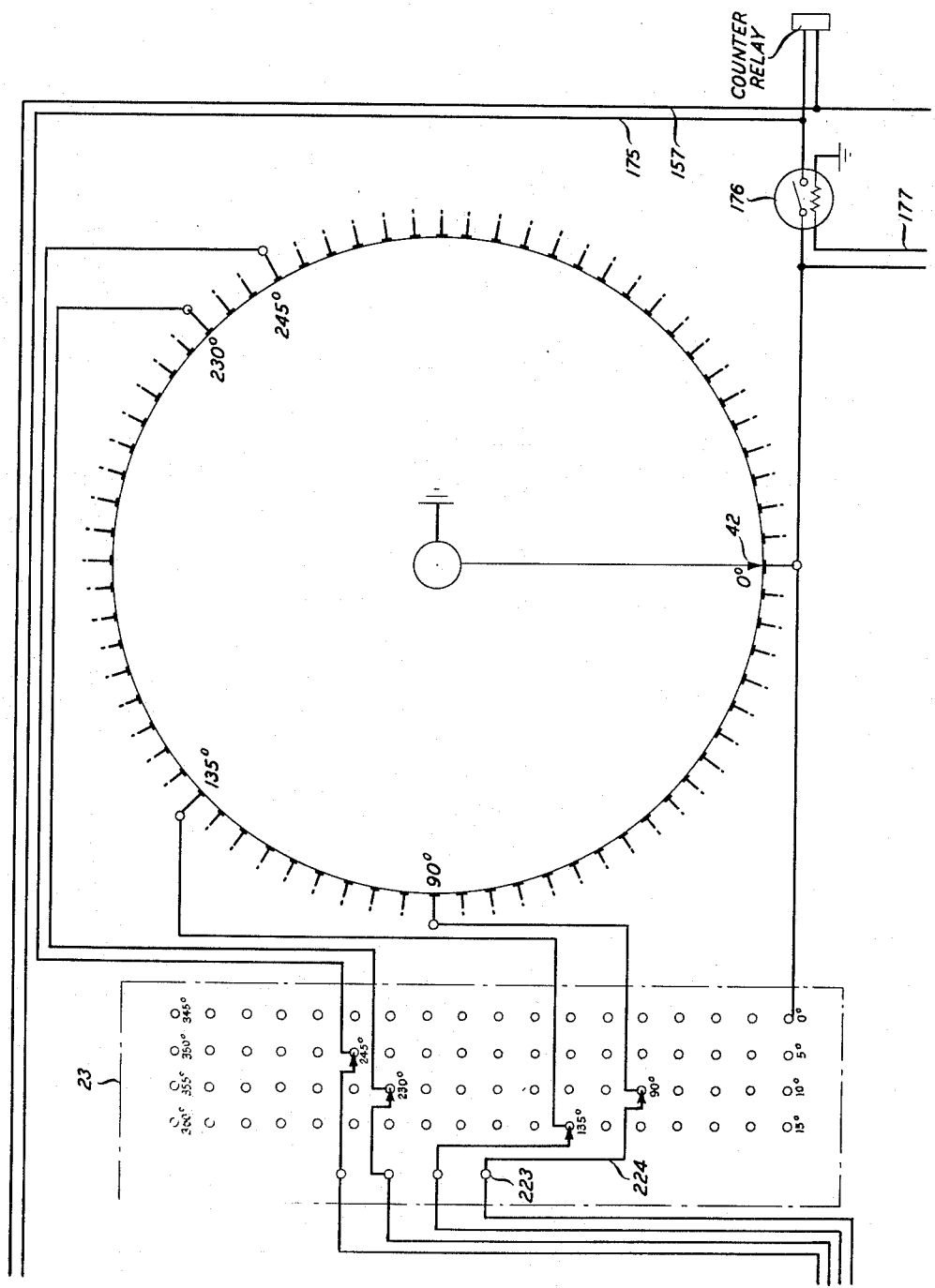

As indicated in FIG. 12, the brush 42, located in the edge of the turntable, is connected to ground and, therefore, when the motor flywheel is manually rotated and contact is made between brush 42 and the zero degree commutator segment, the neon lamp 155 is energized to indicate zero setting of the turntable. The brush 84 and narrow segment 85 are indicated, in FIG. 14, by contacts 158. These contacts are series connected with lamp 156 and current limiting resistor 159 between power lead 157 and ground. When the optical assembly is centered over the turntable, the contacts 158 make, thereby energizing the indicating lamp 156 mounted on the control panel. When both lamps 155 and 156 are lit, the optical assembly and turntable are "zero-set."

The projection lamp, FIG. 14, is connected between the power lead 157 and ground by means of manual switch 162. The closure of this switch provides an indication of the operativeness of the projection lamp and whether the shutter is open or closed.

Figure 10:
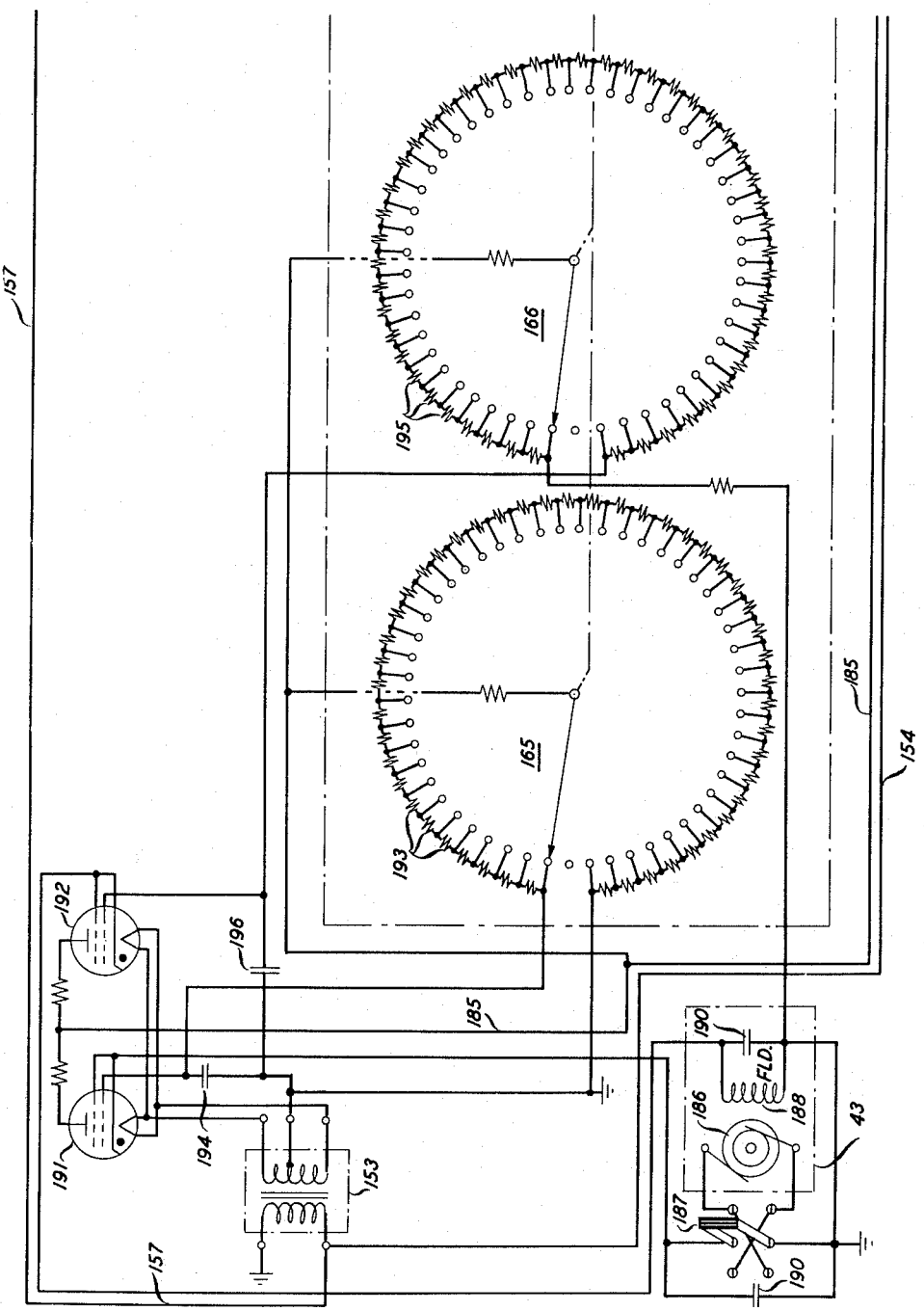
FIGS. 10 through 16 are to be positioned adjacent one another.
Figure 11:
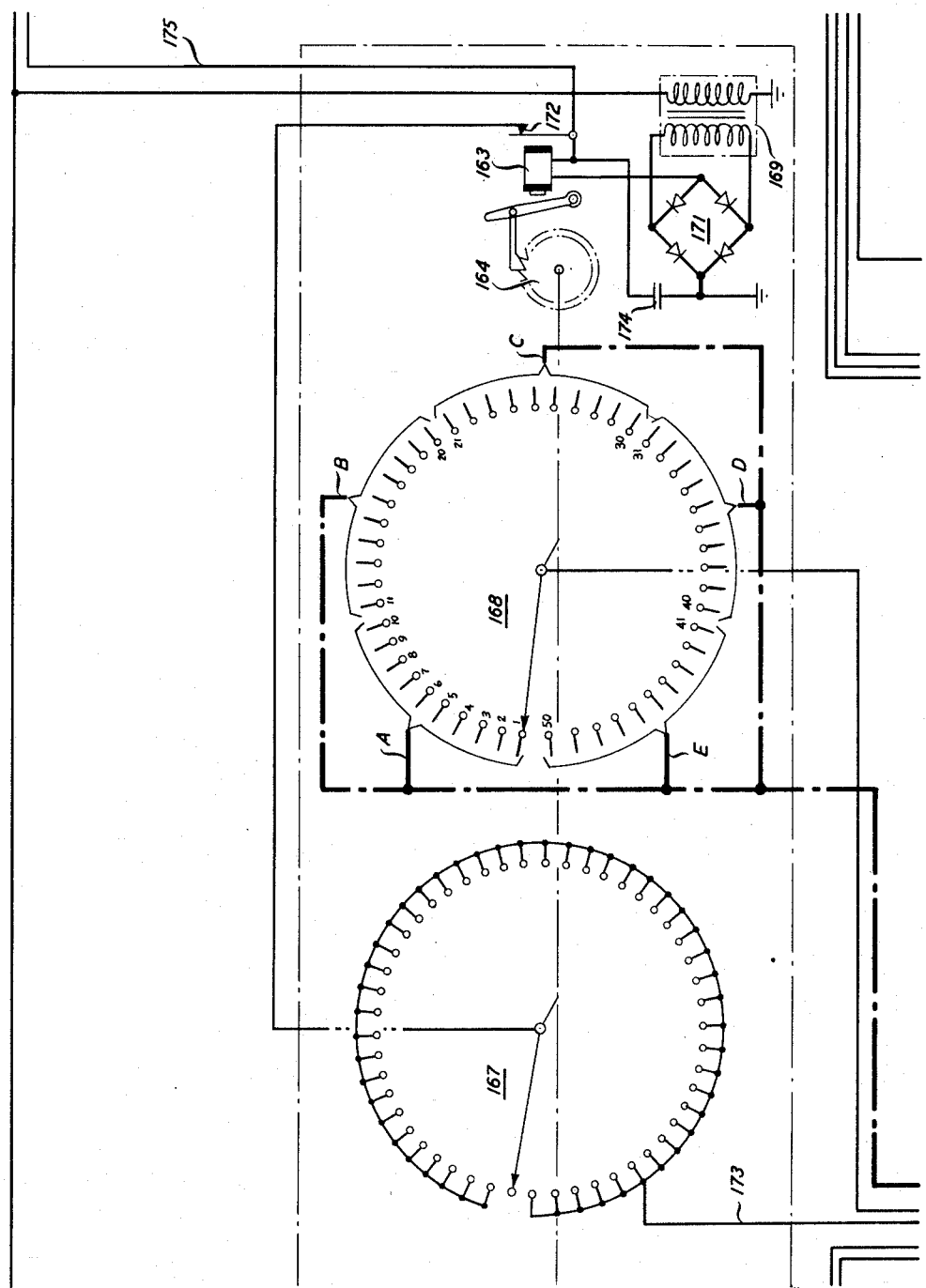

As shown diagrammatically in FIGS. 10 and 11, the electrical circuitry includes a stepping switch assembly comprising an actuating relay coil 163, a ratchet wheel 164 operable in response to energization of said relay coil and four banks of rotary switches 165 to 168, the wiper arms of the latter being mounted on the same shaft as ratchet wheel 164 so to rotate therewith. As will be described hereinafter, the wiper arms of the rotary switches are advanced one position for each complete revolution of the turntable.

As with the optical assembly and turntable, the stepping switch assembly must be zero-set prior to the initiation of operation of the equipment. To this end, the primary of transformer 169 is connected between the power lead 157 and ground. The alternating-current output of the secondary is full wave rectified in rectifier 171 and a rectified potential is thus applied to one end of relay coil 163. The other end of coil 163 is connected, via the normally closed contacts 172, to the wiper arm of rotary switch 167. As shown in FIG. 11, most all the contacts of switch 167 are connected together and to the lead 173. This latter lead, in turn, is connected to ground through a manual reset switch, FIG. 15, and normally closed contacts associated with relay 180.

If the stepping switch assembly is not at the start or zero-set position, all that need be done is to depress the manual reset switch. This connects the one end of relay coil 163 to ground via the contacts 172, rotary switch 167, lead 173, the reset switch and the normally closed contacts of relay 180. Since the other end of the relay coil is directly connected to the output of rectifier 171, the relay 163 will be energized. This energization, however, opens the contacts 172 and relay 163 is therefore immediately deenergized. If the manual reset is held in the make position, the relay will again be energized and again deenergized, and so on. This causes a step-like rotation of the ratchet wheel and the associated wiper arms until the wiper arm of rotary switch 167 reaches the position shown. Since the contact at this position is unconnected, the relay 163 is no longer provided with a path to ground and, therefore, further energization thereof is not possible. This unconnected contact thus constitutes the zero-set position of the stepping switch.

The capacitor 174 shunts the contacts 172 to prevent arcing.

The lead 175 connects the zero degree commutator segment to the relay coil 163 via a time delay switch 176. Thus, with the contacts of switch 176 closed, the one side of said relay coil will be connected to ground when brush 42 contacts the zero degree commutator segment. Since the other side of the relay coil is permanently connected to the output of rectifier 171, the relay coil 163 will be energized, once per revolution, to cause the stepping switch assembly to advance one position.

The time delay switch 176 prevents the relay 163 from being energized by the initial zero setting of brush 42. The contacts of switch 176 remains open until sometime after the start button, FIG. 15, is depressed. Depression of the start button applies power, via lead 177, to the heat dissipating resistor of the time delay switch and, further, initiates rotation of the turntable causing brush 42 to move off the zero degree segment. The heat dissipated by said heat dissipating resistor serves to close the contacts of switch 176 sometime before the end of the first revolution. The contacts of switch 176 thereafter remain closed.

As shown in FIG. 12, the counter relay is connected between the power lead 157 and the zero degree commutator segment. Accordingly, the counter relay is energized every time the brush 42 passes the zero degree point.

The start relay 180 is connected to the alternating-current input line by means of the start button and to ground by means of the normally closed stop button and relay contacts 170. The energization of relay 180 performs several functions. First, it opens the path from the reset button to ground so as to prevent false actuation of the stepping switch assembly due to an accidental striking or depression of the reset button. Second, it closes contacts 181 and thereby applies alternating current to the projection lamp, FIG. 14. Third, the effected closure of contacts 182 results in power being applied to lead 177 which, among other things, initiates the aforementioned heat dissipation in thermal time switch 176. Finally, closure of contacts 184 results in power being applied to the plates of the thyratron tubes 191 and 192 via the lead 185.

The lead 183 is connected from the power lead 177 to one side of the relay 180 to cause said relay to "self-latch" after depression of the start button.

The direct-current motor 43, FIG. 10, comprises an armature 186 and a field 188. The armature is adapted to be connected, by means of the double-pole, double-throw switch 187, in the cathode circuit of thyratron 191 and the field is directly connected in the cathode circuit of thyratron 192. Switch 187 serves to change the direction of current flow in the armature to thereby reverse the direction of rotation of the motor and turntable.

Filamentary power is provided by transformer 153 and, as previously mentioned, "A.-C." voltage is applied to the plates of the thyratrons via lead 185. The bank of series connected resistors 193 is connected between the control grid of thyratron 191 and ground, in shunt with capacitor 194. And, the bank of series connected resistors 195 is connected between the control grid of thyratron 192 and ground, in shunt with capacitor 196. The wiper arms of the rotary switches 165 and 166 are connected to the power lead 185.

Thyratron control of direct-current motors is well known and has been treated extensively in the literature (see, for example, Electronic Instruments by Greenwood, Holdam and MacRae, Radiation Laboratory Series, volume 21, pages 405 through 417, and Electric Circuits and Machines by Robertson and Black, Van Nostrand Company, section 17.7). Briefly, the thyratron tubes 191 and 192 perform as half-wave rectifiers with one supplying current to the armature and the other current to the field of the motor. The capacitors 190 serve to smooth or filter the pulsating rectified current. The speed of the motor is controlled by changing the average current supplied to said armature and field. The grid connected potentiometers, comprising rotary switches 165 and 166 and their associated banks of resistors 193 and 195, function in combination with the shunt connected capacitors 194 and 196 as phase shifting means to shift the phase of the A.-C. voltage applied to the control grids. As will be clear to those in the art, the phase of the grid voltage with respect to the plate voltage determines the point in each cycle at which each thyratron fires and this, in turn, determines the average current delivered thereby.

Since the speed of a direct-current motor is directly proportional to the applied armature current and inversely proportional to the field flux, the rotation of the wiper arms of rotary switches 165 and 166 should produce equal and opposite phase shift effects. To this end, it will be seen, in FIG. 10, that the two banks of series connected resistors 193 and 195 are inversely connected to their respective grids. Therefore, as the stepping switch assembly is step-rotated at the conclusion of each revolution, the average current delivered to the armature is successively decreased and the current to the field is successively increased to thereby reduce the rotational speed of the motor and turntable. As previously indicated, the motor speed is controlled so that the linear speed at which the projected light passes over the film remains essentially constant from revolution to revolution.

Automation of the apparatus is achieved by means of a plurality of selector switch control units 201–207, FIGS. 13–16, and the pin jack patching board 23, FIG. 12. Since the control units 202–206 are identical to unit 201, the showing of the former has been abbreviated. The control unit 201, entitled "First Tab Control (Open Shutter)," comprises a bank of selector switches 211–215 which are mounted, in stacked fashion, with their wiper arms "ganged." As indicated by the reference letters A–E, in FIGS. 11 and 13, the contacts of the selector switches 211–215 are electrically connected to the contacts of rotary switch 168, the ten contacts of selector switch 211 being successively connected to the first ten contacts of rotary switch 168, the ten contacts of switch 212 being connected to the second ten contacts of switch 168, the contacts of switch 213 being connected to the third set of ten contacts of switch 168, etc. The wiper arms of the selector switches 211–215 are connected to successive contacts on the "tens" selector switch 216 and the wiper arm of the latter is connected to the relay coil 217.

The wiper arm of rotary switch 168 is connected to the power lead 177 and thus at some point in the step-like rotation of the stepping switch assembly A.-C. power will be delivered to the relay coil 217 via the rotary switch 168, one of the selector switches 211–215 and the "tens" selector switch 216.

Referring now to FIG. 8, the shutter assembly should be actuated so that light is projected onto the film taped to the turntable at the 90 degree point of the third revolution. To accomplish the same, the ganged wiper arms of switches 211–215 are moved to the third contact position and the "tens" selector switch 216 is positioned at its first contact, all as shown in FIG. 13. Thus, at the beginning of the third revolution of the turntable, the brush 42 contacts the zero degree commutator segment and this causes the actuation of the stepping switch relay 163 to thereby step-rotate the wiper arm of rotary switch 168 to the next or third contact position. Power is then immediately applied to the relay coil 217 via the power lead 177, the wiper arm and third contact of rotary switch 168, the third contact and wiper arm of selector switch 211, and the first contact and wiper arm of switch 216.

With the wiper arm of the "tens" selector switch 216 at the second contact position, the above-described energization of relay coil 217 would occur at the beginning of the thirteenth revolution of the turntable and with said wiper arm at the third contact position, said energization would occur on the twenty-third revolution, et cetera.

Upon energization, the relay coil 217 is connected to the power lead 177 via contacts 219 and normally closed contacts 221. Relay 217 is, therefore, "self-latching" and will thus remain energized until the closed contacts 221 are opened at a later time.

The shutter solenoid 132, FIG. 14, is connected at one end to the power lead 177 and at the other end to the lead labeled (90°) via the contacts 222. This latter lead is connected to the female socket 223 located on the pin jack patching board 23 and, as previously described, each commutator segment is likewise electrically connected to a respective female socket in the patching board. Therefore, by means of the adjustable or movable interconnecting wire 224, associated with the patching board, the female socket 223 can be interconnected with any desired commutator segment. In the present case, it is assumed to be connected to the 90° commutator segment. Accordingly, when the brush 42 contacts the 90° commutator segment, the one side of the shutter solenoid 132 will be momentarily grounded and thus the solenoid will, in turn, be momentarily energized. Since the shutter is set to initially block off the light, the momentary energization of the shutter solenoid step-rotates the shutter (that is, ratchet wheel 127) one position to permit the passage of light.

The control unit 202, entitled "First Tab Control (Close Shutter)," comprises a bank of selector switches, a "tens" selector switch and a relay coil 227 identical to that of control unit 201. The stacked selector switches of unit 202 are interconnected with the rotary switch 168 in the same manner as the selector switches 211–215 and further they are positioned or set, in the above-described manner, so that relay coil 227 is also energized at the beginning of the third revolution of the turntable. As with relay coil 217, coil 227 is self-latching. One side of the shutter solenoid 132 is therefore connected, via the contacts 228, to the lead labeled (135°), FIG. 13. This latter lead is interconnected, in the above-described manner, to the 135° commutator segment. Accordingly, when the brush 42 contacts this segment, the said one side of the shutter solenoid will be momentarily grounded and this results in momentary energization of the solenoid. The shutter is thence step-rotated to the next position, thereby cutting off or interrupting the light.

At the beginning of the fourth revolution, the brush 42 contacts the zero degree commutator segment causing the wiper arm of switch 168, as well as the other wiper arms, to step to the fourth contact position. However, since the relays 217 and 227 are self-latching and remain energized, the shutter solenoid 132 will again be energized, in the above-described fashion, to pass and cut off the light at the 90° and 135° points, respectively.

To merely produce on the fourth revolution another arcuate line, such as indicated by numeral 231, FIG. 8, would not provide a satisfactory end tab. Rather, the line produced must be of such a thickness that it overlaps the line produced on the third revolution. This thickness is preset, as heretofore described, by line widening controls 34.

The control unit 205, entitled "First Tab Line Widening Control," is, again, essentially the same in structure and electrical interconnections as control unit 201. However, in this instance the selector switches thereof are set to actuate the relay 231 at the beginning of the fourth revolution. Thus, when the wiper arm of switch 168 is stepped to the fourth contact position at the beginning of the fourth revolution, relay 231 is energized to self-latch itself in the same manner as relay 217. The line widening solenoids 113 are connected at one end to power lead 177 and at the other end to ground via contacts 232. Thus, with the solenoids 113 energized at the beginning of the fourth revolution, the 90° to 135° line traced on the photographic film will be of such a thickness as to overlap the line traced during the third revolution of the turntable.

Since the relay 231 is self-latching and remains energized, the line widening solenoids 113 also remain energized. Likewise, the self-latching relays 217 and 227 remain energized with the result that wide lines are also traced on the film during the fifth and sixth revolutions of the turntable and these extend from 90° to 135° as heretofore explained.

The line to be traced during the seventh revolution should be of the original selected thickness and, therefore, the line widening solenoids 113 must be deenergized. The width of the line traced during the sixth revolution is sufficient to assure overlapping with the line traced during the seventh revolution.

The relay 233 of control unit 205 is connected at one end to the seventh contact position of rotary switch 168 by means of a selector switch assembly similar to the assembly of switches 211–216 of control unit 201. Thus, when the relay 233 becomes energized at the beginning of the seventh revolution, the normally closed contacts 234 are opened to open the self-latching path of relay 231, which, in turn, opens the ground path of the line widening solenoids to deenergize the same.

As evident from FIG. 8, for the seventh revolution, the projected light should not be interrupted at the 135° point as it was heretofore. Therefore, the control unit 202 must be deenergized at the start of the seventh revolution. To this end, the relay 235 is connected to the seventh contact position of switch 168 in the manner previously described. The relay 235 is thus energized at the beginning of, and throughout, the seventh revolution with the result that relay 227 is deactivated and the path between the 135° commutator segment and one side of the shutter solenoid 132 is opened. Accordingly, the shutter solenoid will no longer be energized at the 135° point for the seventh and subsequent revolutions.

As previously described, relay 217 is self-latching and, therefore, it will remain activated after the initial energization thereof. Hence, the shutter solenoid will again be energized to pass light at the 90° point of the seventh revolution. Since the control unit 202 no longer functions to cut off the light at the 135° point, a line will be traced on the photographic film throughout the remainder of the seventh revolution and the beginning of the eighth. Now, if relay 217 were to remain energized throughout the eighth revolution, the shutter solenoid 132 would again be energized when the brush 42 contacted the 90° commutator segment. However, the shutter is now in a light passing condition and, therefore, energization of the same at the 90° point of the eighth revolution would advance the shutter (ratchet wheel 127) one position to thereby cut off the light. For this reason, it is necessary that the self-latching relay 217 be deenergized at the beginning of the eighth revolution.

The relay 220 is connected to the eighth contact position of switch 168 via the set selector switches 241–245 and the "tens" selector switch 246. At the beginning of the eighth revolution the relay 220 is thus energized to deenergize relay 217 and thereby open the path between the shutter solenoid 132 and the lead labeled (90°).

The shutter mechanism continues to pass light until it is again actuated and from FIG. 8 it is seen that this should occur at the 245° point of the fifteenth revolution.

The control unit 203, entitled "Second Tab Control (Closed Shutter)," is, again, essentially the same as control unit 201. However, the selector switches of unit 203 are set to actuate the relay 251 at the beginning of the fifteenth revolution. The energization of this relay causes the same to self-latch, in the same fashion as relay 217, and, further, connects the shutter solenoid 132 to the lead labeled (245°) via contacts 252. Thus, when the brush 42 contacts the 245° commutator segment, the solenoid 132 will be energized to thereby cut off or block the projection of light onto the turntable.

The control unit 204, entitled "Second Tab Control (Open Shutter)," is the same as control unit 201 and hence by proper setting of its selector switches the relay 253 will be energized on the sixteenth revolution. The contacts 254 associated with relay 253 serve to connect the shutter solenoid to the lead labeled (230°). Since the shutter is intercepting or blocking the light at the beginning of the sixteenth revolution, the energization of the solenoid 132, which occurs when brush 42 contacts the 230° commutator segment, results in the light again being passed and projected onto the film. However, inasmuch as relay 251 remains energized, the light is again cut off at the 245° point.

The control unit 206, entitled "Second Tab Line Widening Control," is identical to control unit 205 both in its structure as well as in its interconnections with the rotary switch 168 and the line widening solenoids 113. The selector switches of this unit are set so that relay 255 is energized at the beginning of the sixteenth revolution and this, in turn, results in energization of the line widening solenoids 113. Thus, the 230° to 245° line traced on the photographic film during the sixteenth revolution will be of an extended width sufficient to overlap the line traced on the fifteenth revolution.

The relays 251, 253 and 255 are self-latching and hence the line traced during the sixteenth revolution is repeated during the seventeenth and eighteenth revolutions.

The relays 256, 257 and 258 of control units 203, 204 and 206, respectively, are each connected to the rotary switch 168 by selector switch means such as that associated with relay 220 of control unit 201. The selector switch means of relays 256, 257 and 258 are set so that these relays are energized at the beginning of the nineteenth revolution. Energization of relays 256 and 257 deactivates the relays 251 and 253, respectively, and hence the shutter solenoid 132 will no longer be momentarily energized at the 230° and 245° points as previously described. Likewise, energization of relay 258 deactivates relay 255 which, in turn, results in the line widening solenoids 113 being deactivated.

Figure 16:
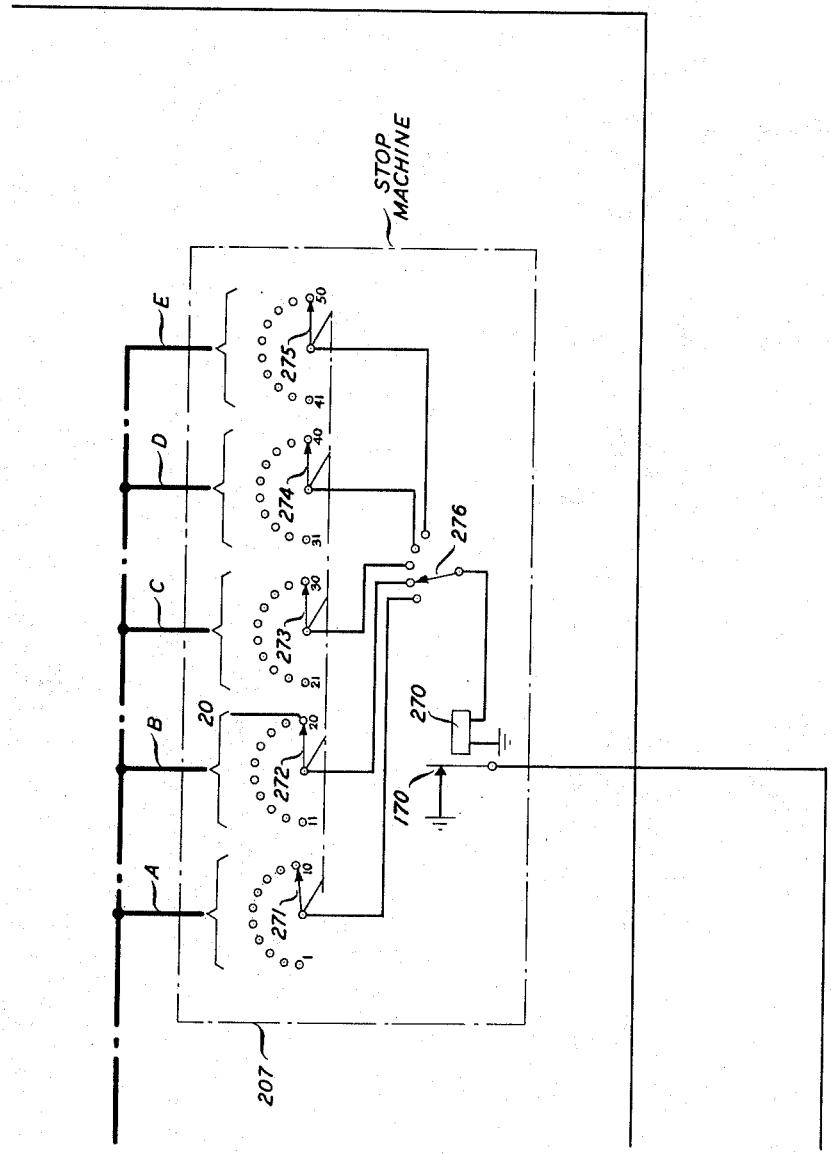

The production of the photographic inductor master is now complete and all that needs be done is stop the equipment. To this end, the relay 270 of control unit 207 is connected to the rotary switch 168 by means of the gauged selector switches 271–275 and the "tens" selector switch 276. Since the very last actuation of the shutter mechanism resulted in interruption of the projected light, the turntable can continue to rotate without effect; that is, no line will be traced on the film taped thereto. Therefore, the machine can be stopped at the end of the last operative revolution (the eighteenth in this case) or any thereafter. In FIG. 16, the selector switches are shown set to stop the equipment at the beginning of the twentieth revolution. When the stepping switch assembly is stepped rotated at the beginning of the twentieth revolution, the relay 270 is energized thus opening contacts 170 which, in turn, opens the path to ground of start relay 180 to deenergize the same.

The photographic film is then removed from the turntable and developed in standard fashion. The above-described production of the inductor master must, of course, be carried out in a dark room subject to the film manufacturer's recommendations.

All other parameters remaining the same, a coil of higher Q may be obtained when the line width is increased slightly from convolution to successive convolution. In FIGS. 17 and 18, there is shown a modification for providing this gradual increase. As with the above-described modification, the arms 108 are integral with a yoke portion 111 and the latter is urged by coil spring 281 against the line width adjustment knob 32. A scale, indexed in terms of line width, is scribed on the adjustment knob 32, and a threaded bolt 282 integral with the latter is received in a tapped hole 283 in the carrier block. Now, with the programming bar 284 moved out of contacting engagement with the follower pin 285, the knob 32 can be rotated to move the arms 108 inwardly or outwardly therewith. Thus, in essentially the same fashion as previously described, the knob 32 is set to provide a coil of preselected constant width.

A coil of gradually increasing or decreasing width is achieved by means of the programming bar 284 and the follower pin 285. The bar 284 is integral at one end with the stanchion 286 and the latter is held secure to the plate 38 by means of bolt 287. Bolt 287 extends through a slot 288 provided in the plate 38 and it is threaded into a tapped hole provided in the metallic plate 289. If the bolt 287 is loosened slightly, the center of the stanchion can be positioned at any point along the length of the elongated slot 288. When positioned as desired, bolt 287 is tightened to maintain this position. As indicated in FIG. 18, the bar 284 can also be angularly disposed, with the extent thereof indicated on the scale marked on plate 291. This plate is supported in an elevated position, by supports 292, so that after the bar is positioned as desired, the bolt 293 is tightened to retain said position. Bolt 293 passes through an arcuate elongated slot 294 in plate 291 and is threaded into a securing nut (not shown) which is disposed on the other side of the plate.

The follower pin 285 is slidably received in an extended axial bore 295 provided in bolt 282 and laterally extending pin 296 which is integral with the follower pin extends through the longitudinally extending, diametrical slot 297 also provided in bolt 282. The ends of the pin 296 extend outwardly beyond bolt 282 and are received in a vertically extending slot 298 cut in yoke 111. The pin is capable of rotating in this slot.

When the knob 32 is rotated to provide a spiral line of preselected constant width, its inward or outward movement is conveyed to the arms 108 as a result of the yoke 111 being spring-biased against said knob. The rotation of bolt 282 also rotates the laterally extending pin 296 and its integrally connected follower pin 285 but this of itself conveys no motion to the yoke 111 and arms 108.

When a spiral line of varying width is desired, the stanchion 286 is first located at a predetermined point along the length of slot 288 to thereby provide the desired initial line width. The programming bar 284 is then disposed at the appropriate angle (note—the angular disposition of this bar in FIG. 18 is greatly exaggerated) and the bolts 287 and 293 are tightened so as to maintain the bar in this position. With the knob 32 backed off as shown in FIG. 18, the coil spring 281 spring-biases the yoke 111 outwardly and the yoke acting against the pin 296 urges the follower pin 285 into contact engagement with the programming bar. Thereafter, as the carrier block 36 and the optical assembly are moved laterally of the turntable, the inward or outward movements of the follower pin, effected by bar 284, will be transmitted to the yoke 111 and integral arms 108 via the pin 296 located in the slot in said yoke.

It will be clear to those skilled in the art that the disclosed apparatus can be used to produce either a positive or negative print and thus the word "film" is used generically herein. The linear speed at which the projected light should pass over the film will depend, of course, upon the type of film used, as well as the light intensity and the width of the projected rectangle. Once the type film, et cetera, has been settled upon, a satisfactory linear speed can be readily arrived at.

The use of the apparatus described above is merely illustrative and it will be clear to those in the art that minor modifications of the shutter and control system will permit the production of masters for printed commutators and other circular or spiral configurations. Accordingly, it is to be understood that the above-described embodiments are merely illustrative of the principles and applications of the present invention and that numerous modifications or alterations may be made therein without departing from the spirit and scope of the invention.

What is claimed is:

1. Apparatus for producing photographic inductor masters comprising a turntable upon which unexposed photographic film is adapted to be mounted, light projecting means mounted above said turntable for projecting a narrow beam of light on said film, means for rotating said turntable, means for moving said light projecting means a predetermined lateral distance for each revolution of said turntable, a shutter disposed between said light projecting means and said turntable, control means for automatically actuating said shutter to alternately pass and intercept the light during predetermined portions of the rotation of said turntable, masking means also disposed between said light projecting means and said turntable for defining the image projected on the latter, and control means for actuating said masking means to effect predetermined variations in said image during selected portions of the rotation of said turntable.

2. Apparatus for producing photographic inductor masters comprising a turntable upon which unexposed photographic film is adapted to be mounted, light projecting means mounted above said turntable for projecting a narrow beam of light thereupon, motor means for rotating said turntable, means coupled to said motor means for moving said light projecting means a predetermined lateral distance for each revolution of said turntable, means for automatically controlling the rotational speed of said turntable so that the linear speed at which the projected light passes over said turntable remains substantially constant from revolution to revolution, a shutter disposed between said light projecting means and said turntable, control means for automatically actuating said shutter to alternately pass and intercept the light during predetermined portions of the rotation of said turntable, masking means also disposed between said light projecting means and said turntable for defining the image projected on the latter, and control means for automatically actuating said masking means to vary said image during predetermined portions of the turntable rotation.

3. Apparatus for producing photographic inductor masters comprising a turntable upon which unexposed photographic film is adapted to be mounted, light projecting means mounted above said turntable and adapted to project a beam of light toward the center thereof, a motor for rotating said turntable, means coupled between said motor and said light projecting means for moving the latter a predetermined lateral distance for each revolution of said turntable, electronic speed control means for controlling the speed of said motor to maintain the linear speed at which the projected light passes over the turntable at a substantially constant value, shutter means disposed between said light projecting means and said turntable, control means for automatically actuating said shutter means to alternately pass and intercept the light during predetermined portions of the rotation of said turntable, masking means also disposed between said light projecting means and said turntable for defining the image projected on the latter, and control means for automatically actuating said masking means to increase the size of the projected image during preselected revolutions of said turntable.

4. Apparatus for producing photographic inductor masters comprising a turntable upon which unexposed photographic film is adapted to be mounted, light projecting means mounted above said turntable and adapted to project a beam of light toward the center thereof, a motor for rotating said turntable, means coupled between said motor and said light projecting means for moving the latter a predetermined lateral distance for each revolution of said turntable, speed control means for controlling the speed of said motor to maintain the linear speed at which the projected light passes over the turntable at a substantially constant value from turntable revolution to revolution, shutter means disposed between said light projecting means and said turntable, control means for automatically actuating said shutter means to alternately pass and intercept the light during predetermined portions of the total rotation of said turntable, masking means also disposed between said light projecting means and said turntable for defining the image projected on the latter, said masking means defining a rectangular image whose length parallels the direction of lateral movement of said light projecting means, and control means for automatically actuating said masking means to substantially increase the length of said rectangular image during preselected revolutions of said turntable.

5. Apparatus for producing photographic inductor masters comprising a turntable upon which unexposed photographic film is adapted to be mounted, light projecting means mounted above said turntable and adapted to project a narrow rectangular beam of light toward the center thereof, a motor for rotating said turntable, means coupled between said motor and said light projecting means for moving the latter a predetermined lateral distance for each revolution of said turntable, electrical speed control means coupled to said motor for controlling the speed thereof to maintain the linear speed at which the projected light passes over the turntable at a substantially constant value from turntable revolution to revolution, shutter means disposed between said light projecting means and said turntable, control means for automatically actuating said shutter means to alternately pass and intercept the light during predetermined portions of the total rotation of said turntable, and means for gradually varying the length of the rectangular image projected on said turntable from turntable revolution to revolution.

6. Apparatus for producing photographic inductor masters comprising a turntable upon which unexposed photographic film is adapted to be mounted, light projecting means mounted above said turntable and adapted to project a beam of light toward the center thereof, a motor for rotating said turntable, means coupled between said motor and said light projecting means for moving the latter a predetermined lateral distance for each revolution of the turntable, speed control means coupled to said motor for controlling the speed thereof to maintain the linear speed at which the projected light passes over the turntable at a substantially constant value from turntable revolution to revolution, shutter means disposed between said light projecting means and said turntable, means for automatically actuating said shutter means to alternately pass and intercept the light during predetermined portions of the rotation of said turntable, masking means also disposed between said light projecting means and said turntable for defining the image projected on the latter, said masking means defining a rectangular image whose length parallels the direction of lateral movement of said light projecting means, means for automatically actuating said masking means to substantially increase the length of said rectangular image during preselected revolutions of said turntable, and means for gradually increasing the length of said rectangular image from turntable revolution to revolution.

7. Apparatus for producing photographic inductor masters comprising a turntable upon which unexposed photographic film is adapted to be mounted, light projecting means mounted above said turntable and adapted to project a beam of light toward the center thereof, a motor for rotating said turntable, means coupled between said motor and said light projecting means for moving the latter a predetermined lateral distance for each revolution of said turntable, electrical means for controlling the speed of said motor to maintain the linear speed at which the projected light passes over the turntable at a substantially constant value from turntable revolution to revolution, shutter means disposed between said light projecting means and said turntable, means for automatically actuating said shutter means to alternately pass and intercept the light during predetermined portions of the rotation of said turntable, masking means also disposed between said light projecting means and said turntable for defining the image projected on the latter, said masking means defining a rectangular image whose length parallels the direction of lateral movement of said light projecting means, adjustment means coupled to said masking means for providing manual adjustment of the length of said rectangular image, control means for automatically actuating said masking means to substantially increase the length of said rectangular image during preselected revolutions of said turntable, and manually adjustable means associated with said control means for setting the length to which said rectangular image will be increased when said masking means is actuated in response to said control means.

8. Apparatus as defined in claim 7 wherein said motor is reversible to permit reversal of the turntable rotation and the direction of movement of said light projecting means.

9. Apparatus as defined in claim 7 wherein said means coupled between said motor and said light projecting means includes a plurality of sets of normally disengaged mating gears of different gear ratios and gear shifting means for intermeshing a selected one of said sets of gears to laterally move said light projecting means at a preselected rate.

10. Apparatus for producing photographic inductor masters comprising a turntable upon which unexposed photographic film is adapted to be mounted, light projecting means mounted above said turntable and adapted to project a beam of light toward the center thereof, a motor for rotating said turntable, means coupled between said motor and said light projecting means for moving the latter a predetermined lateral distance for each revolution of said turntable, electrical speed control means for controlling the speed of said motor to maintain the linear speed at which the projected light passes over the turntable at a substantially constant value from turntable revolution to revolution, shutter means disposed between said light projecting means and said turntable, masking means also disposed between said light projecting means and said turntable for defining the image projected on the latter, said masking means defining a rectangular image whose length parallels the direction of lateral movement of said light projecting means, a brush located in the edge of said turntable, a plurality of commutator segments fixedly positioned in a circle adjacent said turntable so as to be alternately contacted by said brush as said turntable is rotated, a stepping switch, means for step-rotating said stepping switch each time said brush contacts a selected one of said commutator segments, shutter control means connected to said stepping switch and to preselected commutator segments for actuating said shutter means to alternately pass and intercept light when said brush contacts said preselected commutator segments during predetermined revolutions of said turntable, and line widening control means connected to said stepping switch for actuating said masking means to substantially increase the length of said rectangular image during preselected revolutions of said turntable.

11. Apparatus for producing photographic inductor masters comprising a turntable upon which unexposed photographic film is adapted to be mounted, light projecting means mounted above said turntable and adapted to project a beam of light toward the center thereof, a motor for rotating said turntable, means coupled between said motor and said light projecting means for moving the latter a predetermined lateral distance for each revolution of said turntable, electrical speed control means for controlling the speed of said motor to maintain the linear speed at which the projected light passes over the turntable at a substantially constant value from turntable revolution to revolution, shutter means disposed between said light projecting means and said turntable, masking means also disposed between said light projecting means and said turntable for defining the image projected on the latter, said masking means defining a rectangular image whose length axis parallels the direction of lateral movement of said light projecting means, a brush located in the edge of said turntable, a plurality of commutator segments located at evenly spaced points on a circle which is adjacent said turntable, said brush being adapted to alternately contact said commutator segments as the turntable is rotated, a stepping switch having the wiper arm and a plurality of contacts associated therewith, means for step-rotating said stepping switch and wiper arm once per revolution each time said brush contacts a selected one of said commutator segments, shutter control means connected to preselected commutator segments, a plurality of manually operable selector switches connecting said shutter control means to selected ones of said contacts, said shutter control means serving to actuate said shutter means to alternately pass and intercept light when said brush contacts said preselected commutator segments during selected revolutions of said turntable, line widening control means, and a plurality of manually operable selector switches connecting said line widening control means to preselected ones of said contacts, said line widening control means serving to actuate said masking means to substantially increase the length of said rectangular image during preselected revolutions of said turntable.

References Cited in the file of this patent

UNITED STATES PATENTS

| 1,381,849 | Sandell | June 14, 1921 |
| 2,506,604 | Lokker et al. | May 9, 1950 |

FOREIGN PATENTS

| 319,425 | France | Nov. 12, 1902 |